Patented July 25, 1944

2,354,351

UNITED STATES PATENT OFFICE 2,354,351

METHOD OF COATING STRUCTURAL MATERIAL

Clyde C. Schuetz, Mount Prospect, Ill., assignor to United States Gypsum Company, Chicago, Ill., a corporation of Illinois No Drawing. Application January 11, 1941, Serial No. 374,081

2 Claims. (Cl. 117—70)

The present invention relates to an improvement in the coating of absorbent cementitious articles by means of a liquid glazing composition which contains a volatilizable vehicle, being particularly applicable to the treatment of set cementitious structural materials such as cement blocks, plates, and particularly that species known in the art as asbestos-cement shingles, slabs, and siding.

One of the particular objects of the present invention is to provide a method of coating such articles with a glazing composition which contains an ingredient or ingredients which are capable of reacting with the constituents of the cementitious material, for instance the therein contained calcium compounds or free lime.

It is therefore one of the objects of the invention to apply such a glazing composition under conditions which greatly accelerate the initial drying or setting of the applied glazing material, especially a second coat thereof, so that a second coat of another composition may be applied shortly after the application of the first coat without there being any reaction between the second coat and the constituents of the article coated.

A further object of the invention is to speed up the production of glazed cementitious structural material, such as asbestos-cement sheets, with a silicate composition containing constituents reactive with the silicate to form therewith a water-insoluble and weather resistant glazing or coating on said cement sheets, the process being conductible at such speed that it will lend itself to a continuous operation, as for example when the sheets are carried on a moving belt and when the glaze is applied by means of rollers, sprays, or similar coating-applying means.

One of the outstanding features of the present invention lies in the preconditioning of the cementitious articles, which involves the removal from the surface thereof of the therein contained sensible moisture, this being accomplished by any suitable drying operation, which may be conducted either at room temperature, as for example by the use of a vacuum, or at more elevated temperature, with or without a vacuum. The main purpose of the removal of this sensible moisture is to render the cementitious articles highly absorbent and receptive to the thereto applied coating composition, so that the volatile vehicle therein contained will be absorbed in part by the dry constituents of the articles—for example, by any thirsty or superdried asbestos fibers therein—while at the same time there may be sufficient heat in the articles to cause fairly rapid surface evaporation of the vehicle contained in the coating composition. It will be obvious that in the case of relatively thick articles, the articles do not need to be dry throughout; but only the surface to be coated needs to be dried to such an extent that it can absorb the vehicle from a relatively thin coating without becoming saturated. By sensible moisture is meant that moisture which can be detected by sight or touch. Care should be taken, however, that the temperature of the cementitious articles, when the coat of glazing composition is applied thereto, is below the boiling point of the vehicle contained in the coating composition, because it is highly desirable to avoid the formation of actual bubbles of vapor in the composition, as such bubbles have a tendency to leave small blisters or pock marks in the glazing coat; and as the second coat is usually fairly thin, it would be insufficient completely to cover such imperfections in the priming coat.

A further advantage in the present invention lies in the fact that the first coat may be relied upon also to react with the reactable constituents in the cementitious material, as for example the therein contained calcium compounds, so as to prevent any further reaction of such constituents with the subsequently applied coating material.

The fundamental parts of the present invention have already been disclosed in applicant's copending application Serial No. 305,124, filed November 18, 1939, and the present application is a continuation-in-part thereof. In the aforesaid earlier application the coating of asbestos cement sheets with a silicate coating composition is described, particular emphasis being placed in said application on the nature of the composition that is applied to the sheets, which consists of the heat reaction products of a soluble alkali metal silicate and a compound selected from the group consisting of zinc oxide, calcium carbonate, high burned magnesium oxide and magnesium carbonate, in which the relative proportions of $M_2O:SiO_2:MO$ are respectively 11.7–26.6, 42.1–62.7, 19.1–41.2 mole per cent (the total in any case equaling 100) and in which $M_2O$ represents the alkali constituent and $SiO_2$ the silica constituent of the silicate and MO the silicate compound. In these formulas, the letter "M" stands for metal broadly, and of course in the formula $M_2O$ such metal will be monovalent, usually being sodium or potassium, while in the formula MO the metal obviously has the same valency of oxygen, namely, 2.

The present invention, however, is distinctly not limited to the exact type of composition, but is broadly applicable to the coating of absorbent cementitious articles, irrespective of the actual composition of the silicate or other glaze thereto applied.

Applying the principles of the present invention to a specific example, but without wishing thereby in any way to limit the broader aspects of the invention, the coating of asbestos-cement shingles with a silicate composition containing, for instance, zinc oxide, which will form, on proper heating and baking, a weather-resistant coating in accordance with the disclosure in the parent application, Serial No. 305,124, of the present applicant, will now be described. Asbestos shingles as ordinarily made contain approximately 85% of Portland cement and 15% of asbestos fiber. The Portland cement, in hydrating, frees calcium hydroxide. The shingles are stacked in tight piles for curing. As a consequence, carbon dioxide from the air has access to only the edges of the shingles. Thus, under ordinary conditions in a 28-day curing period, a band about one inch wide around the edge of each shingle is quite thoroughly carbonated, but the major portion of the area still contains high amounts of free calcium hydroxide. It has been found that if a shingle containing this free lime, and having a moist surface, is coated for example with a zinc oxide-sodium silicate coating as described previously, it will upon drying develop light-colored streaks within the area that has not been carbonated by contact wiht the carbon dioxide of the atmosphere. No baking treatment will remove these streaks. Furthermore, it has been discovered that if the shingle surface is dry when the coating is applied, the streaks will not always appear during drying or baking but will usually appear after a short period upon weather exposure, regardless of the baking conditions.

However, if one dries the surface of the shingle, appplies one coat, allows it to dry sufficiently so that it loses "tackiness" and the gloss resulting from the presence of water, and then applies a second coat, one can, by properly controlling the baking conditions, obtain a hardened coating which withstands weather exposure without change over long periods. Apparently the first coat serves to react with, and thus fix, the lime. However, before the second coat is applied, the first coat should be sufficiently dry so that there is no free intermingling of the materials in the two coats. On the other hand, the first coat must not be dried by used of such sustained elevated temperatures as would promote the reaction between the zinc oxide, or other reactant, and the sodium silicate. In other words, a second coat cannot be successfully applied over a baked or substantially reacted first coat. The first coat should not be subjected to a temperature of more than 200 F., and this temperature should not be held more than the time required to remove the free water from the composition.

In actual practice, the material, such as asbestos Portland cement shingles to be treated, is passed on a cable conveyor through a heated tunnel in which the shingles acquire a temperature of from about 100° F. to 150° F., whereby also any moisture is removed from the surface of the shingles. The warm shingles are then carried under sprays where the first coat of coating composition is applied. The heat contained in the shingles causes the first coat thus applied to set up in about two minutes, becoming dry to the touch. It was found that attempts to thus dry the first coat by application of heat to the coated shingles usualy caused blisters by expansion of tiny entrained air bubbles. By preheating the shingles before the application of the coating, the air expands and breaks free while the coating will still flow and thus heal any openings. The shingles on the conveyor, after the drying interval, pass under a second spray booth in which they receive the second coat of composition. The coated shingles are then ready to be baked for the purpose of rendering the coating weather-resistant.

The above procedure may be modified by passing the asbestos-cement shingles over a suction plate which will draw heated air around and possibly some through the shingles for the purpose of removing therefrom any therein contained sensible surface moisture. The shingles may, by this operation, be heated to a temperature of anywhere from 100° to 185° F.; or alternatively, and without using the suction means, the shingles may be heated by passing them through a suitable oven at a temperature within the limits just mentioned, the main purpose being to remove, at least from the surface thereof, all therein contained sensible moisture and at the same time to heat them to a temperature which will cause rapid evaporation of the water contained in the coating composition. A considerable portion of this water, however, will be almost immediately absorbed by the thirsty asbestos fibers of the asbestos-cement plate and some of it will also penetrate into the interstitial spaces or pores of the composition. The total effect is a rapid setting up or drying of the priming coat, this being occasioned in part by such absorption and in part by the volatilization of the water. By reason of the fact that the temperature is still below the boiling point of the vehicle in the coating composition, in this case the water, no bubbles of steam or vapor will form in the composition; and therefore there will be no blisters or pock marks on the first coat. Of course, if a vehicle is used which contains other volatile materials than water—for example, alcohol, benzol, benzine, gasoline, or the like—the temperature to which the shingles or other articles are preheated may be modified in accordance with the boiling point of the particular vehicle. Thus, when using alcohol or benzol, the temperature should be below the boiling point of these materials. On the other hand, if one were to use a vehicle such as xylene (xylol), the temperature to which the shingles or other articles are preheated may be above the boiling point of water but should still be below the boiling point of the xylene. In any event, the main object is to produce a rapid removal of the volatiles from the coating composition, without however causing any constituent thereof actually to reach its boiling point.

A very suitable coating composition for the purpose of the present invention may be that which is fully described in the parent application, Serial No. 305,124, such as Example I or Example II, contained on pages 3 and 4 of said application as filed.

After the first coat has been dried, which—if the sensible moisture has been properly removed from the shingles and their temperature has been properly adjusted—may require as little as one minute, a second coating of either the same composition or a suitable other composition may then be applied, as by spraying, roller coating or the like, whereafter the thus coated shingles may be baked in accordance with the disclosure in the parent application Serial No. 305,124.

The present invention is to be distinguished from those operations in which a lacquer or enamel is sprayed upon nonabsorbent metallic surfaces or the surfaces of glass and the like, because such surfaces do not have any absorbent action; and if they were heated, merely a removal of the volatile materials in the coatings thereto applied would result by evaporation alone. Inasmuch as these coatings have a definite thickness and the evaporation must take place therefore only from the surface, it will be obvious that any undue heating of the surfaces to which the coating composition is applied would lead to the formation of vapor bubbles in the composition. In the present instance, however, by virtue of the absorbent nature of the cementitious material, particularly when the sensible moisture has been removed therefrom, the drying or setting of the applied composition takes place from both sides of the film, namely, that which is absorbed into the material coated and that which evaporates into the surrounding air.

While it has already been proposed to coat various types of asbestos cement plates with coating compositions, this has always been accomplished at ordinary room temperatures; and the advantages of the present invention have never before been appreciated and are therefore believed to be entirely new.

It will, of course, be obvious that the present invention is applicable to the production of building materials of various kinds and may even be applicable to the coating of absorbent cementitious articles which are made from such materials as Sorel cement, calcined gypsum, Keene's cement, or other setting materials. It will also be obvious that the invention is applicable to any absorbent structural material which contains constituents which are capable of reacting with the thereto applied coating material, and therefore the present invention is not to be limited to the examples herein given but is to be construed in accordance with the hereunto appended claims.

Furthermore, the invention is not to be limited to the method of the application of the coating composition, as this may be done by means of brushes, air sprays, mechanical sprays, roller coating, or even by dipping or laying one surface of the material onto the surface of a mass of the coating composition, just so long as a coat of the priming composition comes into proper contact with the materials being coated.

It is also obvious that the invention may be practiced when only a single coating is applied, because the basic principles of the removal of the sensible moisture will apply. As previously mentioned, the preconditioning of the surface with means for locking up the free lime, such as by treatment with carbon dioxide, may be advisable in such cases. A single coat may thus suffice, being subsequently baked as described or, if the nature of the coating permits, being merely allowed to dry or harden.

I claim:

1. Process of coating asbestos-cement articles having free calcium hydroxide in the surface thereof with a liquid glazing composition containing a soluble silicate and an insoluble metal compound reactive therewith which comprises the steps of first removing the sensible moisture contained in the surface of said asbestos-cement articles by preheating the same to a temperature sufficient to remove therefrom the therein contained sensible moisture, thereby rendering the same highly absorbent and bringing them to a temperature which will cause rapid evaporation of water thereto applied but without causing said water to boil, then applying a priming coat of such glazing composition to the preheated articles and causing said coat to dry by the evaporation of the therein contained water as well as by the absorption of some of such water by the superdried fibrous constituents of the asbestos-cement articles to form a layer comprising said soluble silicate and insoluble metal compound which will not freely intermingle with subsequently applied coatings, then applying a second coat of such composition, completely drying both coats and baking to complete the insolubilization reaction between the soluble silicate and said insoluble metal compound.

2. Process of coating asbestos-cement shingles having free calcium hydroxide in the surface thereof with a liquid silicate glazing composition containing soluble silicate and an insoluble metal compound reactive therewith which comprises the steps of heating said asbestos cement shingles to a temperature not exceeding 185° F. so as to remove all sensible moisture from at least the surface thereof and to render them highly absorbent, then applying thereto a priming coat of said glazing composition and effecting the evaporation of the moisture contained in said composition by absorption of a portion of said water by the fibrous constituents and interstices of the asbestos-cement shingles as well as by evaporation of the water therefrom to form a layer comprising said soluble silicate and insoluble metal compounds which will not freely intermingle with subsequently applied coatings, then applying a second coat of said glazing composition, completely drying both coats, and then subjecting the thus treated shingles to a baking operation to complete the insolubilization of the compound formed between the soluble silicate and said aforementioned insoluble metal compound.

CLYDE C. SCHUETZ.